FIG. 1.
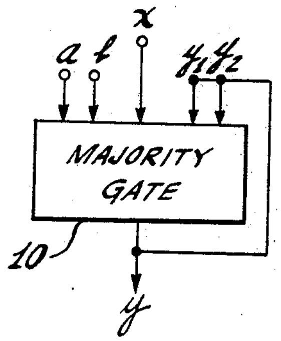
FIG. 3.
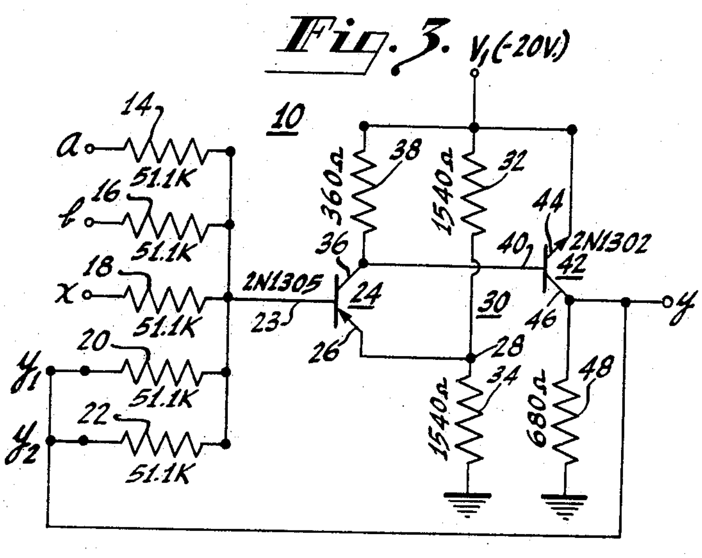
FIG. 2.
TABLE A
| | a | b | x | $y_1$ | $y_2$ | y |
|---|---|---|---|---|---|---|
| A | 1 | 0 | 0 | 0 | 0 | 0 |
| | 0 | 1 | 0 | 0 | 0 | 0 |
| | 1 | 0 | 1 | 0 | 0 | 0 |
| | 0 | 1 | 1 | 0 | 0 | 0 |
| | | | | | | |
| | 0 | 1 | 0 | 1 | 1 | 1 |
| | 1 | 0 | 0 | 1 | 1 | 1 |
| | 0 | 1 | 1 | 1 | 1 | 1 |
| | 1 | 0 | 1 | 1 | 1 | 1 |
| | | | | | | |
| B | 1 | 1 | 1 | 0 | 0 | 1 |
| | 1 | 1 | 0 | 1 | 1 | 1 |
| | 1 | 1 | 1 | 1 | 1 | 1 |
| | 1 | 1 | 0 | 0 | 0 | 0 |
| | | | | | | |
| C | 0 | 0 | 1 | 0 | 0 | 0 |
| | 0 | 0 | 0 | 1 | 1 | 0 |
| | 0 | 0 | 1 | 1 | 1 | 1 |
| | 0 | 0 | 0 | 0 | 0 | 0 |
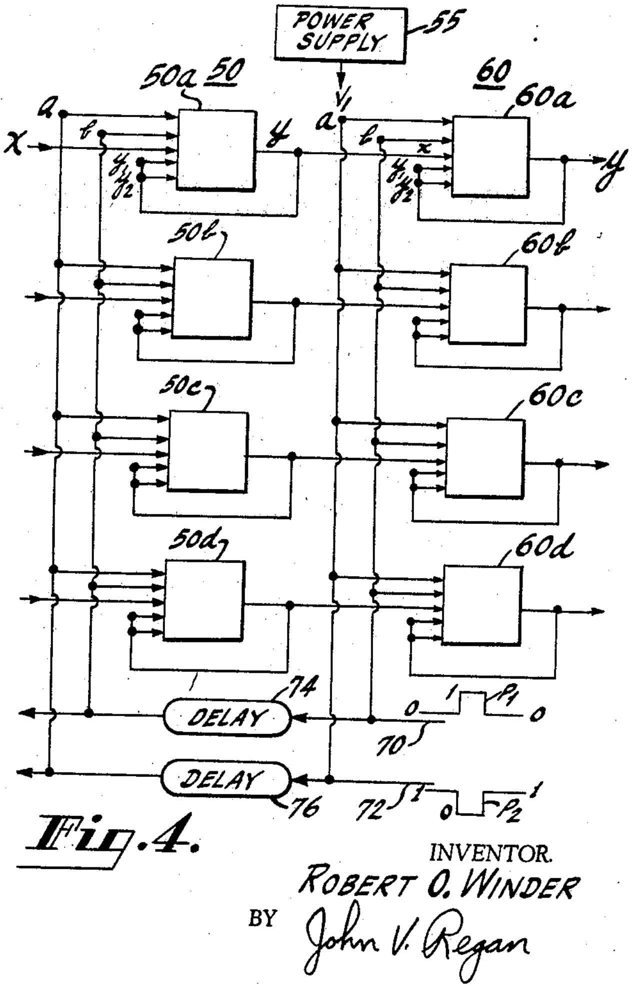
FIG. 4.
INVENTOR.
ROBERT O. WINDER
BY John V. Regan
Attorney FIG. 5.
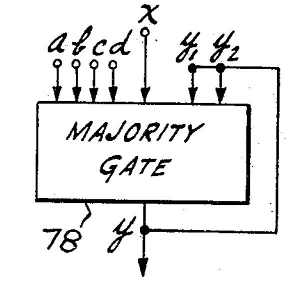
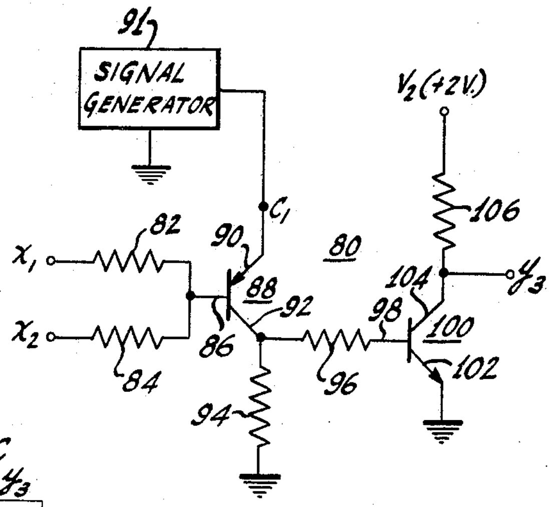
FIG. 6.
TABLE B
| $C_1$ | $x_1$ | $x_2$ | $y_3$ |
|---|---|---|---|
| 1.9V. | 0 | 0 | 0 |
| 1.9V. | 1 | 0 | 1 |
| 1.9V. | 0 | 1 | 1 |
| 1.9V. | 1 | 1 | 1 |
FIG. 7a.
TABLE C
| $C_1$ | $x_1$ | $x_2$ | $y_3$ |
|---|---|---|---|
| .49V. | 0 | 0 | 0 |
| .49V. | 1 | 0 | 0 |
| .49V. | 0 | 1 | 0 |
| .49V. | 1 | 1 | 1 |
FIG. 7b.
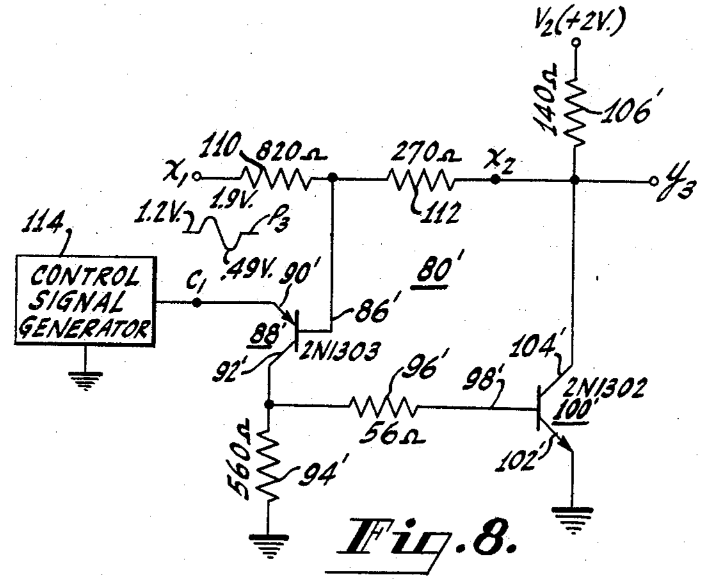
FIG. 8.
INVENTOR.
ROBERT O. WINDER
BY John V. Regan
Attorney INVENTOR.
ROBERT O. WINDER
BY
Samuel Cole
Attorney INVENTOR.
ROBERT O. WINDER
BY
Samuel Cohen
Attorney INVENTOR.
ROBERT O. WINDER
BY
[signature]
Attorney United States Patent Office
3,487,316
Patented Dec. 30, 1969

3,487,316

THRESHOLD GATES AND CIRCUITS

Robert O. Winder, Trenton, N.J., assignor to RCA Corporation, a corporation of Delaware Continuation-in-part of application Ser. No. 343,030, Feb. 6, 1964. This application July 13, 1966, Ser. No. 567,344
Int. Cl. H03k 19/20
U.S. Cl. 328—92 18 Claims

ABSTRACT OF THE DISCLOSURE

Threshold gate circuits which perform logic functions and which also can store the information they produce. The gate circuits have control signal inputs, information signal inputs and a feedback signal input which is derived from the output signal. The values of the control signals determine whether a gate circuit will operate as a memory element which is not disturbed by changes in value of the information signals or as a logic element. In the latter case, the values of the control signals determine the logic function the gate circuit will realize.

This application is a continuation-in-part of application Ser. No. 343,030, fild Feb. 6, 1964, and now abandoned.

This invention relates to threshold gates which perform both storage and logic functions and to circuits which incorporate such gates.

A threshold gate is a circuit with a plurality of input signal leads and one or more output signal leads. Signals representing binary digits are applied to the respective input leads, each such signal having an effective weight of 1 or some multiple of 1. The output signal or signals indicate whether the effective number of ones represented by the input signals, that is, whether the sum obtained when adding the weights of all input signals representing a 1, is equal to or greater than a predetermined value known as the threshold level.

A majority gate is a particular type of threshold gate which has an odd number $n$, of inputs, each of which has a weight of 1, and whose threshold is $(n+1)/2$. The output signal, in other words, has a binary value which is equal to the binary value of the majority of the input signals. For example, in the case of a 5-input majority gate, if 3 or 4 or 5 of the inputs represent a 1, the output represents a 1; if 3 or 4 or 5 of the inputs represent a 0, the output represents a 0. (More generally, a threshold gate with inputs $x_1, x_2 \ldots x_n$, of respective weights $w_1, w_2 \ldots w_n$, where the sum of $w_1+w_2 \ldots w_n$ is an odd integer, and with a threshold level $$(w_1+w_2 \ldots +w_n+1)/2$$

may be called a "neutral" threshold gate.)

A minority gate has the same characteristics as a majority gate except that the output produced by the minority gate is complementary to that produced by the majority gate. For example, in the case of a 5-input minority gate, each input of weight 1, if 3 or 4 or 5 of the inputs represent a 1, the output represents a 0; if 3 or 4 or 5 of the inputs represent a 0, the output represents a 1.

The general object of this invention is to provide multiple function building blocks for electrical systems such as data processing systems.

A more specific object of this invention is to provide threshold gate circuits which have control signal inputs, zero, one or more than one information signal inputs, and a feedback signal input and which, in response to different values of control signals, perform different functions.

Another object of this invention is to provide a threshold gate circuit which performs the function of a flip-flop and of the input gates to the flip-flop.

Another object of this invention is to provide a threshold gate circuit which operates as a set-reset flip-flop.

Another object of the invention is to provide threshold gate circuits which perform multiple functions such as storage, MAJORITY, AND, OR and so on.

Another object of this invention is to provide a new and improved shift register made up of threshold gate circuits such as described above.

Another object of this invention is to provide an asynchronous cascaded network made up of threshold gate circuits such as described above.

Another object of the invention is to provide a high speed multiplier made up of threshold gate circuits such as described above.

The circuits of the invention each include a threshold gate and means for applying $n$ input signals $x_1, x_2 \ldots x_n$ with the respective weights $w_1, w_2 \ldots w_n$ to the gate, where $n$ is 0, 1 or more than 1 and $w_1, w_2 \ldots w_n$ are integers. The output signal of the threshold gate is fed back to the input to the gate with weight $w$, where $w$ is an integer greater than the sum of $w_1+w_2 \ldots +w_n$. In addition, $m$ control signals $c_1 \ldots c_m$ are applied to the gate with respective weights $v_1 \ldots v_m$, where $m$ is an integer greater than 1, and $v_1 \ldots v_m$ are integers.

The invention is discussed in greater detail below and is shown in the following drawings of which:

FIGURE 1 is a block diagram of a majority gate connected to operate as a gateable bistable circuit;

FIGURE 2 is a truth table representing the operation of the majority gate of FIGURE 1;

FIGURE 3 is a schematic circuit diagram of one embodiment of the majority gate of FIGURE 1;

FIGURE 4 is a block diagram of a shift register utilizing the majority gate circuits of FIGURE 1;

FIGURE 5 is a block diagram of a majority gate circuit which functions as a gateable flip-flop;

FIGURE 6 is a schematic circuit diagram of a threshold gate which may be utilized in practicing the invention;

FIGURE 7 is a truth table illustrating the operation of the threshold gate of FIGURE 6;

FIGURE 8 is a schematic circuit diagram of a bistable circuit embodying the threshold gate of FIGURE 6;

The blocks making up the figures are circuits which receive electrical signals indicative of binary digits (bits) and which produce outputs indicative of bits. For the sake of brevity, it is sometimes stated in the explanation which follows, that a 1 or 0 is supplied to or obtained from a stage rather than saying that a signal representing a 1 or 0 is applied to or obtained from the stage.

The present invention is perfectly general in the sense that it is applicable to both majority (and minority) gates and to other types of threshold gates. In FIGURES 1 and 5 the threshold gates employed are, in fact, majority gates and are so legended. In both of these figures the output signal is shown feeding back to two input terminals. It is to be understood, of course, that this is merely a way of indicating that the weight of the feedback signal is 2. In practice, there can be two terminals present. However, as an alternative there may be only one terminal physically present and the weight 2 assigned to that terminal, for example by placing a resistor in series therewith which is half the effective value of the resistors in series with the other terminals.

FIGURES 9–12 indicate the weights of the input signals by numbers applied next to the corresponding input terminals. For example, in FIGURE 11, the signal $y$ fed back has the weight 4 and this is indicated by the number 4 next to the $y$ input terminal. In these figures the threshold of the gate is indicated by the letter T=some number, where the number represents the threshold value. For example, in FIGURE 11 the gate illustrated may be termed a neutral threshold gate and has a threshold of 6. As another example, in FIGURE 13 the gate illus trated is not a neutral threshold gate and has a threshold of 4.

The gates of the invention are shown to have a single output. However, it is to be appreciated that each gate may, in addition, have a complementary output and that the logical inversion necessary to obtain the complementary output may be performed within the gate as discussed, for example in copending application 490,052, and now Patent No. 3,403,267 "Binary Counter and Flip Flop" filed Sept. 24, 1965, by the present inventor.

Figures 9, 10:
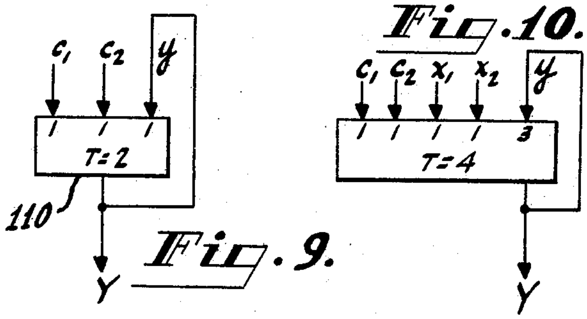
FIGURES 9–13 are block diagrams of other threshold gate circuits according to the invention.

The simplest circuit of the present invention is shown in FIGURE 9. It comprises a 3-input majority gate 110 having inputs $c_1$, $c_2$ and $y$, all of weight 1. The signal $y$ is a feedback signal which comes from the output signal terminal Y. (Here and elsewhere in the discussion, a terminal and the signal applied to or obtained from the terminal are identified by the same letter.)

In the operation of the gate of FIGURE 9, if $c_1 \neq c_2$, that is, if $c_1=0$ and $c_2=1$, or vice versa, the information stored in the circuit cannot be disturbed. For example, if $y=1$ and if one of $c_1$ and $c_2=1$, then two of the three inputs to gate 110 represent 1 and the output must remain a 1. In a similar manner, if $y=0$ and one of the two inputs $c_1$ and $c_2$ is a 0, then two of the three inputs to gate 110 are 0 the output Y must remain 0.

To store new information in the gate 110, both $c_1$ and $c_2$ must be made to have the same value. If $c_1=c_2=1$ then Y must become 1 since at least two of the three inputs are 1. If $c_1=c_2=0$ then Y must become 0 since at least two of the three inputs to gate 110 are equal to 0. After new information is entered into the gate 110, it may be retained in the gate by making $c_1=1$ and $c_2=0$ or vice versa in the manner already indicated.

The operation of the gate of FIGURE 9 can be described in Boolean terms in the following way. When $c_1$ is the same value as $c_2$ then $$Y=c_1 \cdot c_2 \quad (1)$$

$$\overline{Y}=\overline{c_1} \cdot \overline{c_2} \quad (2)$$

When $c_1$ is $\neq$ to $c_2$ then $$Y=y \quad (3)$$

where Y is the present value of Y and $y$ is the former value of $y$.

A second embodiment of the invention, shown in FIGURE 1, consists of a majority gate having inputs with a total weight of 5, and performs the function both of a flip-flop and of the input gates to the flip-flop. The input terminal $x$ receives an information signal; the input terminals $a$ and $b$ receive control signals; the input terminals $y_1$ and $y_2$, which can be considered as a single terminal which applies a signal of weight 2 to the gate, are feedback terminals which receive the signal from the output terminal Y of the gate 10. The feedback signal permits the majority gate 10 to operate as a flip-flop, that is, as a bistable storage element; the values of the control signals determine whether information signals can or cannot be "gated" into the flip-flop.

In the operation of the gate of FIGURE 1, when $a \neq b$, that is, when $a=0$ and $b=1$, or vice versa, the information signal $x$ cannot affect the state of the gate. This is so because the control inputs then cancel and the majority gate 10 acts like a 3-input majority gate, the value of two of whose inputs is fixed. Thus, if $y=1$, two of the three inputs are 1, or in terms of the 5-input gate shown, three of the five inputs are fixed at 1, and $x$ has no effect.

If $a=b=1$, then if $y$ was previously a 1, it will remain a 1 regardless of the value of $x$ or if $x$ is a 1, $y$ will become 1 regardless of its former value. In terms of operation as a flip-flop, the flip-flop will be set when $a$ and $b$ both equal 1 and the information signal $x$ is also equal to 1. The signals $a=b=1$ can be considered priming signals for a 3-input AND gate to a flip-flop, and the signal $x=1$ as the enabling signal for this gate which causes the gate to apply a set signal to the set terminal of the flip-flop.

When $a$ and $b$ are 0, then if $y$ previously was a 0, it will remain 0. If $a$ and $b$ are 0 and $x$ is also a 0, $y$ will become a 0 regardless of its former value. Thus, this situation can be compared to resetting a flip-flop. The signals $a=b=0$ can be considered as priming signals for a 3-input NOR gate to a flip-flop and the signal $x=0$ as the enabling signal to the NOR gate which causes the NOR gate to apply a reset signal to the reset terminal of the flip-flop.

In Boolean terms, the operation of the gate of FIGURE 1, under the various conditions discussed above, may be described as follows:

When $a \neq b$ $$y=y^* \quad (4)$$

where $y$ is the present value of $y$ and $y^*$ is the former value of $y$.

When $a=b=1$, then $$y=x+y^* \quad (5)$$

When $a=b=0$, then $$y=x \cdot y^* \quad (6)$$

The truth table of FIGURE 2 also illustrates the operation of the circuit. The bracketed portion of the table legended A corresponds to Equation 4; the bracketed portion of the table legended B corresponds to Equation 5; the bracketed portion of the table legended C corresponds to Equation 6.

If during the application of an information signal $x$, first $c_1=c_2=0$ and then $c_1=c_2=1$, or vice versa, then the circuit will store $x$. In Boolean terms, Equations 5 and 6 are combined to give $$y=(x+y^*) \cdot x=x \quad (6a)$$

Thereafter $c_1$ may be made unequal to $c_2$ so that the information present in the circuit will continue to be stored.

A third embodiment of the invention is shown in FIGURE 5. This embodiment can operate as a memory element such as a flip-flop, an OR circuit, an AND circuit, a flip-flop which can be unconditionally set and a flip-flop which can be unconditionally reset. The circuit has a single output terminal $y$ and inputs of total weight 7. The feedback signal, which is shown connected to two input terminals $y_1$ and $y_2$, has a weight of 2. The information signal $x$ has a weight of 1 and the control signals $a$, $b$, $c$ and $d$ each have a weight of 1.

For operation of the circuit above as a memory element, two of the four control signal inputs are made to represent a 0 and the remaining 2 control signals to represent a 1. In this condition, at least four of the 7 input weights are of the same value as $y$ so that $x$ cannot disturb the circuit operation. The circuit of FIGURE 5 can be unconditionally reset by making all four control inputs $a$, $b$, $c$ and $d$ equal to 0. This forces $y$ to be a 0 since at least four of the seven input weights are 0. To set the circuit of FIGURE 5, the four control inputs *a, b, c* and *d* are all made to assume the value 1 so that *y* becomes 1.

If three of the four input control signals are 1, then if *x* is a 1, *y* becomes 1, or if *y* is already 1, *y* remains 1. If three of the four control signals are 0, then if *x* is a 1 and *y* is a 1, *y* remains 1 and under all conditions, *y* becomes 0.

The operation of the circuit of FIGURE 5 may be described in Boolean terms by the following equations. When two of the four inputs are 1 and the other two are 0 then:

$$y=y^* \quad (7)$$

When all four control signals are 0, then:

$$y=0 \quad (8)$$

When all four control signals are 1, then:

$$y=1 \quad (9)$$

When three of the four control signals are 1, then:

$$y=x+y^* \quad (10)$$

When three of the four control signals are 0, then:

$$y=x \cdot y^* \quad (11)$$

As in the case of the circuit of FIGURE 1, if the circuit is operated as indicated by Equation 10 and then as indicated by Equation 11 then:

$$y=(x+y^*) \cdot x=x \quad (11a)$$

which means that the circuit will store the *x* signal.

The circuit of FIGURE 5 has six inputs with respective weights 1, 1, 1, 1, 1, 2. Instead, a five input majority gate may be employed with weights 2, 1, 1, 1, 2, where a single control signal of weight 2 is substituted for signals *a* and *b*, for example, and the remaining signals *c, d, x* and *y* have weights 1, 1, 1 and 2, respectively. A modified circuit of this type is employed in the circuit of FIGURE 14. As will become clear in the discussion of FIGURE 14, the operation of the modified circuit is exactly the same as that of the FIGURE 5 circuit since in both cases, of the weight 4 assigned to control signals, binary 1 (or 0) signals may have a total weight of 0, 1, 2, 3 or 4.

A fourth embodiment of the invention is shown in FIGURE 10. It is a 5-input threshold gate having inputs $c_1$, $c_2$, $x_1$ $x_2$ and *y* with respective weights 1, 1, 1, 1, 3. The inputs $c_1$ and $c_2$ are control signal inputs; the inputs $x_1$ and $x_2$ are information signal inputs; the input *y* is a feedback signal.

In the operation of the circuit of FIGURE 10, when $c_1 \neq c_2$, the circuit stores the information then present. In other words $$Y=y \quad (12)$$

If $c_1=c_2=0$, then $Y=1$ if $y=1$ and one of $x_1$ or $x_2$ is 1. In Boolean terms $$Y=y(x_1+x_2) \quad (13)$$

If $c_1=c_2=1$, then Y is 1 if $x_1$ and $x_2$ are 1 or if *y* is 1. In Boolean terms $$Y=y+x_1 \cdot x_2 \quad (14)$$

If the control signals are made $c_1=c_2=0$ and then changed to $c_1=c_2=1$ or vice versa, then the circuit operates as a majority circuit. In the case in which $c_1=c_2=0$, Y is 1 if $x_1$ and *y* are 1 or if $x_2$ and *y* are 1. In the case in which $c_1=c_2=1$, *y* is 1 if $x_1$ and $x_2$ are 1. This majority function, in Boolean terms, is $$Y=y(x_1+x_2)+x_1 \cdot x_2=MAJ(x_1, x_2, y)=yx_1+yx_2+x_1x_2 \quad (15)$$

Figure 11:
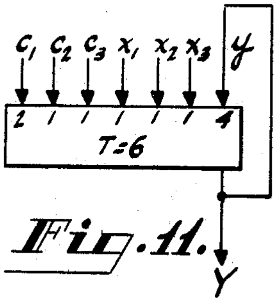

Another embodiment of the invention is shown in FIGURE 11. It is a 7-input threshold gate having inputs $c_1$, $c_2$, $c_3$, $x_1$, $x_2$, $x_3$ and *y* with respective weights 2, 1, 1, 1, 1, 1, 4. The first three inputs $c_1$, $c_2$, $c_3$ are control signal inputs; inputs $x_1$, $x_2$, $x_3$ are information signal inputs; input *y* is a feedback signal.

The operation of the circuit of FIGURE 11 is succinctly given in the following Boolean equations. When $c_1=1$ and $c_2=c_3=0$ or vice versa, the control inputs cancel and $$Y=y \quad (16)$$

When the three control inputs all equal 0, then $$Y=y \cdot MAJ(x_1, x_2, x_3) \quad (17)$$

When $c_1=c_2=c_3=1$ then $$Y=y+MAJ(x_1, x_2, x_3) \quad (18)$$

If three of the four control weights represent 1, that is, for example, if $c_1$ and $c_2$ are 1 and $c_3$ is 0 then $$Y=y+x_1 \cdot x_2 \cdot x_3 \quad (19)$$

If three of the four input control weights represent 0, as for example, when $c_1=0$, $c_2=0$, $c_3=1$, then $$Y=y(x_1+x_2+x_3) \quad (20)$$

The circuit of FIGURE 11 can also be operated by first making all of the control signals a 1 and then all a 0, or vice versa. These two steps combined cause the circuit of FIGURE 11 to operate as a majority gate, as defined by the following equation which readily may be derived from Equations 17 and 18

$$Y=MAJ(x_1, x_2, x_3) \quad (21)$$

Figure 12:
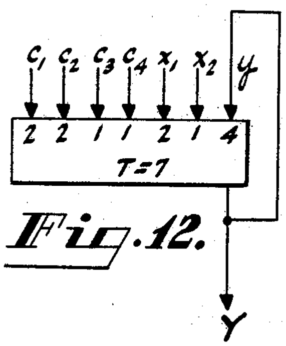

The circuit of FIGURE 12 comprises a 7-input threshold gate having inputs $c_1$, $c_2$, $c_3$, $c_4$, $x_1$, $x_2$ and *y* with respective weights 2, 2, 1, 1, 2, 1, 4. The signals $c_1$, $c_2$, $c_3$ and $c_4$ are control signals; the signals $x_1$ and $x_2$ are information signals; the signal *y* is a feedback signal. As in the previous cases, when the sum of the weights of the control signals representing 1 is equal to the sum of the weights of the control signals representing 0, the circuit operates as a memory element. For example, when $c_1=c_3=0$ and $c_2=c_4=1$, then $$Y=y \quad (22)$$

When five of the six input weights of the control signals represent a 0 and the remaining control signal represents a 1 then $$Y=y \cdot x_1 \quad (23)$$

When five of the six input weights of control signals represent a 1 and the remaining control signal a 0, then $$Y=y+x_1 \quad (24)$$

There are a number of other ways in which the gate of FIGURE 12 may be operated depending upon the permutations of control signals. In view of the many examples already given, these should be evident to the reader.

Figure 13:
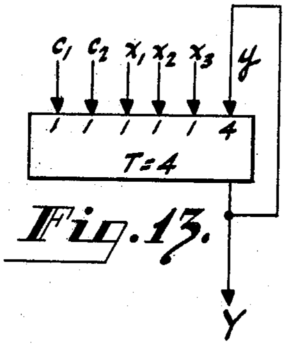

The circuit of FIGURE 13 is a six input threshold gate having inputs $c_1$, $c_2$, $x_1$, $x_2$, $x_3$ and *y* with respective weights 1, 1, 1, 1, 1, 4. This is not a neutral gate as the total of input weights is 9 and the threshold is 4. In other words, if four or more of the total of 9 input weights represent a 1, the output Y is a 1.

In the operation of the circuit of FIGURE 13 if $c_1=c_2=0$ then $$Y=y \quad (25)$$

If $c_1=c_2=1$ then $$Y=y+MAJ(x_1, x_2, x_3) \quad (26)$$

If $c_1=1$ and $c_2=0$ or vice versa then $$Y=y+x_1 \cdot x_2 \cdot x_3 \quad (27)$$

There are many different ways in which the threshold gate circuits of the invention may be implemented. The actual circuits may employ transistors or vacuum tubes or magnetic cores or cryotrons or two terminal devices such as conventional diodes or tunnel diodes and so on. For purposes of illustration, a number of circuits employing transistors are shown. The first such circuit is illustrated in FIGURE 3. The terminals of this particular circuit have been chosen to correspond to the terminals of the embodiment of FIGURE 1, however, with minor modification the circuit of FIGURE 3 is applicable to all other embodiments of the invention. These modifications entail adding additional input terminals and other similar engineering changes.

The circuit of FIGURE 3 includes a plurality of input terminals $a$, $b$, $x$, $y_1$ and $y_2$ corresponding to the identically legended terminals in FIGURE 1. Each of the input terminals is coupled through a separate resistor, respectively legended 14, 16, 18, 20 and 22, to the base electrode 23 of a first transistor 24.

The first transistor 24 may, for example, be of the PNP type conductivity and includes an emitter electrode 26 coupled to the midpoint 28 of a voltage divider 30. The voltage divider 30 includes a pair of equal valued resistors 32 and 34 connected in series between a source of negative potential $V_1$ and a point of reference potential, chosen as ground. The first transistor 24 also includes a collector electrode 36 coupled through a load resistor 38 to the potential source $V_1$. The collector electrode 36 of the first transistor 24 is also directly coupled to the base electrode 40 of a second transistor 42.

The second transistor 42 is of the NPN type conductivity and includes an emitter electrode 44 coupled directly to the negative potential source $V_1$, and a collector electrode 46 connected through a load resistor 48 to ground. The output terminal $y$ is connected to the collector 46 of the second transistor 42 and when operated as shown in FIGURE 1 is also connected back to the input terminals $y_1$ and $y_2$. The values and types of components utilized in the bistable circuit 10 are shown in FIGURE 3.

In describing the operation of the circuit 10 of FIGURE 3, it is assumed that ground represents the binary digit 0 and a voltage of approximately $V_1$ the binary digit 1. The output signal $y$ is at ground when transistors 42 and 24 are both cut-off and in this condition the circuit 10 is storing a 0. The output terminal $y$ is at a voltage of approximately $V_1$, (−20 v.) when the transistor 42 conducts heavily at saturation and in this condition the circuit 10 is storing a 1. In the same manner, the application of a signal level $V_1$ or −20 volts to an input terminal represents the application of a binary 1, whereas the application of a signal at the zero or ground level represents the application of a binary 0.

The connection of the emitter electrode 26 of the first transistor 24 to the midpoint of the voltage divider 30 establishes a threshold level, namely one-half the potential of the supply $V_1$, which must be overcome before the transistor 24 can be made to conduct. With the magnitude of the potential source $V_1$ at −20 volts, the emitter electrode 26 of the first transistor 24 is at threshold potential of −10 volts. Thus, to forward bias the base-emitter junction of the transistor 24 requires that the base electrode 23 become more negative than −10 volts.

For operation in the manner depicted in Equation 5 ($y=x+y^*$) a binary 1 is applied to terminals $a$ and $b$. Thus, each of the terminals $a$ and $b$ is at the $V_1$ or −20 volt potential level. Assume that the transistors 42 and 24 are initially nonconducting so that the circuit 10 is storing a binary 0 and terminals $y_1$ and $y_2$ are at ground. Under these conditions, the base electrode 23 is at a −10 volt level. When a binary 1 (−20 volts) is applied to the information signal input terminal $x$ from, for example, another circuit such as circuit 10, the potential at the base electrode 23 becomes more negative and assumes a value of approximately −12 volts. The threshold level therefore is exceeded and transistor 24 conducts. The conduction of the transistor 24 forward biases the base-emitter junction of the second transistor 42 and the second transistor 42 conducts. Its collector electrode 46 and hence the output terminal Y is thereupon driven from ground to substantially the −20 volt level and the circuit 10 stores a binary 1.

If the circuit of FIGURE 3 is initially storing a 0, and $a=b=1$, and $x$ is a 0 (ground) then the circuit state is unaffected. Both transistors remain nonconducting.

For the operation described in Equation 6 ($y=x \cdot y^*$), a binary 0 (a signal at ground potential) is applied to terminals $a$ and $b$. Assume circuit 10 is storing a binary 1 and hence the feedback signals $y_1$ and $y_2$ also represent binary 1. Under these conditions, when a binary 0 signal is applied to the information input signal terminal $x$, the bistable circuit 10 switches from the conducting state, wherein a binary 1 signal is stored, to a nonconducting state, wherein a binary 0 signal is stored. With a binary 0 signal applied to the terminal $x$, the potential at the base electrode 23 of the transistor 24 becomes −8 volt. This potential reverse biases the base-emitter junction of the first transistor 24 and cuts off this transistor. The base electrode 40 of the second transistor 42 follows the collector 36 potential of the first transistor 24 and becomes negative and this drives transistor 42 to cut-off. When this occurs, $y$ becomes equal to binary 0 (is at ground) and circuit 10 stores a binary 0. The stored binary 0 signal is also applied to the input terminals $y_1$ and $y_2$ and the circuit is locked in the 0 state.

In the type of operation depicted by Equation 4 ($y=y^*$), signals of opposite binary values are applied to the terminals $a$ and $b$. The control signals $a$ and $b$ therefore effectively cancel each other and relinquish control of the bistable circuit 10, and the feedback signals $y_1$ and $y_2$ determine the circuit state. These signals hold the circuit 10 in its initial operating state regardless of the value of input signals $x$.

The operation of the circuit 10 with the various other possible combinations of input and feedback signals is self-evident from the description above.

The first transistor 24 in FIGURE 3 functions as a switching element to turn on and off the second transistor 42. As a switching element, the transistor 24 draws little current and consequently the threshold reference point 28 of the voltage divider 30 remains substantially at the −10 volt threshold level. The second transistor 42 draws appreciable current from the supply $V_1$ so as to provide a high current output to drive other circuits.

FIGURE 6 is a schematic circuit diagram of another transistorized threshold circuit 80 which, when operated in the manner shown in FIGURE 8, may be utilized in practicing the invention. While only three inputs $x_1$, $x_2$ and $c_1$ are shown, the principles of operation hold for many more inputs than this.

The threshold gate 80 conduts when the sum of the input signals exceeds a threshold level. The threshold gate 80 includes a pair of input signal terminals $x_1$ and $x_2$ which are coupled through the input resistors 82 and 84, respectively, to the base electrode 86 of a first transistor 88. The resistors 82 and 84 may, for example, be of equal value. The emitter electrode 90 of the first transistor 88 is coupled to a control signal or threshold signal generator 91. The collector electrode 92 is coupled through a load resistor 94 to ground, as well as through a coupling resistor 96 to the base electrode 98 of a second transistor 100. The emitter electrode 102 of the second transistor 100 is grounded, while the collector electrode 104 thereof is coupled through a load resistor 106 to a source of positive potential $V_2$. An output terminal $y_3$ is provided at the collector 104 of the second transistor 100.

The threshold gate 80 functions as either an AND gate or an OR gate for the $x_1$ and $x_2$ input signals, depending on the level of the control or threshold signal applied to the emitter 90 by the generator 91. Assuming that ground potential is a binary 1 signal and +2 volts is a binary 0 signal, the application of a threshold signal level of, for example, +1.9 volts to the emitter 90 of the first transistor 88 causes the threshold gate 80 to function as an OR gate. This may be seen from the truth table shown in FIGURE 7*a*. When two binary 0 signals are applied to the terminals $x_1$, $x_2$, the base 86-emitter 90 junction is reverse biased and no conduction occurs. Thus, the signal level at the output terminal $y_3$ is +2 volts or a binary 0. When a binary 1 (ground level signal) is applied to either $x_1$ or $x_2$ or both and the emitter 90 is at +1.9 volts, the base-emitter junction of the transistor 92 becomes forward biased. The conduction of the transistor 88 then drives the second transistor 100 into saturation. The signal level at the output terminal $y_3$ is therefore at ground level producing a binary 1.

When the threshold signal from the generator 92 is reduced to a lower voltage level, such as, for example, +0.49 volts, the gate 80 functions as an AND gate. FIGURE 7*b* shows the truth table for AND operation. When two binary 0 signals (i.e., +2 volt signals) and applied to the terminals $x_1$, $x_2$, the base 86-emitter 90 junction remains reverse biased. When opposite binary signals are applied to the terminals $x_1$ and $x_2$, the base 86 assumes one-half the value of the voltage level $V_2$ or becomes 1 volt. This level still reverse biases the transistor 88. It is only when both the terminals $x_1$ and $x_2$ receive binary 1 signals, i.e., become grounded, that the gate 80 conducts producing a binary 1 output signal from the terminal $y_3$. Thus, both AND and OR gate operation may be obtained from the gate 80 depending on the threshold signal level.

FIGURE 8 is a schematic circuit diagram of a threshold gate 80', corresponding to the gate 80 of FIGURE 6, which is connected to operate as a circuit such as shown in FIGURE 1. Circuit elements which are similar in the two circuits are identified by the same reference numerals, unprimed in FIGURE 6 and primed in FIGURE 8. In the present circuit, however, the input terminal $x_2$ is coupled to the output terminal $y_3$ to provide a feedback signal similar to the feedback signal in the circuit 10. Additionally, the resistors 110 and 112 coupling the terminals $x_1$ and $x_2$, respectively, to the base electrode 86' of the first transistor 88' are not equal. The resistor 112 is appreciably smaller than the resistor 110 making the feedback signal applied to the terminal $x_2$ of greater weight than an input information signal applied to the input terminal $x_1$. The resistor 112 rather than being one-half the value of the resistor 110 is instead about one-third of the value of resistor 110 to insure proper circuit operation, even with reasonable variation of circuit parameters.

A control signal generator 114, in FIGURE 8, applies a control signal $P_3$ to the emitter 90' of the first transistor 88'. The signal $P_3$, shown in FIGURE 8, while of analog form, simulates the effect of the binary signals applied to control terminals *a* and *b* in the circuit 10 of FIGURE 3. The control signal $P_3$ exhibits three different signal levels, a quiescent level, a high level, and a low level. For the values of components shown in FIGURE 8, the quiescent, high and low voltage levels of the control signal $P_3$ may be, for example, 1.2 volts, 1.9 volts, and 0.49 volt, respectively. The quiescent level (corresponding, in binary terms, to $a=1$, $b=0$ or vice versa in the circuit of FIGURE 1) holds the bistable circuit 80' in its initial state regardless of the value of input signal $x_1$.

The high level of signal P operates the threshold gate circuit 80' in a manner similar to the OR gate operation of the gate 80 of FIGURE 6. In this operation, an input binary 1 signal applied to $x_1$ is transferred into the circuit 80', whereas an input binary 0 signal does not affect the state of the circuit. The high level of P corresponds, in binary terms, to the application of $a=b=1$ to the circuit of FIGURE 1.

The low level of the control signal $P_3$ operates the threshold gate circuit 80' in a manner similar to the AND gate operation of the gate 80 of FIGURE 6. In this operation, an input binary 0 signal applied to the input terminal $x_2$ is transferred into the gate 80', whereas an input binary 1 signal does not affect the state of the circuit. This operation corresponds, in binary terms, to the application of $a=b=0$ to the circuit of FIGURE 1.

If the control signal $P_3$ rises from the quiescent level so as to become more positive than $V_2$, the threshold gate bistable circuit 80' is rendered conductive or unconditionally set. This corresponds to $a=b=c=d=1$ in FIGURE 5. Alternatively, if the control signal $P_3$ drops from the quiescent level to become zero or negative, the threshold gate bistable circuit 80' is rendered nonconductive or unconditionally reset. This corresponds to $a=b=c=d=0$ in FIGURE 5. Such a setting or resetting of the circuit 80' may also be utilized to transfer binary signals into the circuit 80'. For example, if the circuit 80' is first set, then the application of a low level control signal (i.e., an AND level signal or .49 volt) transfers a binary 0 signal into the circuit if the input signal $x_1$ is a binary 0 signal. If the input signal $x_1$ is a binary 1 signal, no change occurs. Alternatively, if the circuit 80' is first reset, then the application of a high level control signal (i.e., an OR level signal or 1.9 volts) transfers a binary 1 signal into the circuit if the input signal $x_1$ is a binary 1 signal. If the input signal $x_1$ is a binary 0 signal, no change occurs.

There are many uses for the threshold gate circuits of the invention. A number of such uses, not meant to be exhaustive, are illustrated in the remaining figures.

FIGURE 4 shows a circuit which employs the threshold gate circuits 10 of FIGURE 1. The circuit comprises two registers 50 and 60, each with four stages, legended 50*a* through 50*d* and 60*a*–60*d*, respectively. Together, they operate as two stages of a shift register which shifts four bits in parallel, from left to right in FIGURE 4.

The output terminal *y* of each stage in register 50 is connected to the input terminal *x* of the corresponding stage in register 60. The output terminal *y* of each stage is also coupled back to the feedback terminals $y_1$ and $y_2$ of the same stage.

The control signal terminal *a* of each of the stages in the shift register 60 is connected to a shift line 70; the control signal terminal *b* in each of the stages in the shift register 60 is connected to the shift line 72. The shift line 70 is connected through a delay circuit 74 to the control signal terminals *a* in each of the stages in the shift register 50. Similarly, the shift line 72 is connected through a delay circuit 76 to the control signal terminals *b* in each of the stages in the shift register 50 also. The delay circuits 74 and 76 exhibit substantially identical delays.

Shift, or control signal, pulses $P_1$ and $P_2$ are applied to the shift lines 70 and 72 to transfer binary information stored in the shift register 50 into the shift register 60. For purposes of the present discussion, a positive-going voltage of given value is assumed to represent a 1 and ground to represent a 0. The control signal pulses $P_1$ and $P_2$ may, for example, be generated by a pair of one-shot multivibrators (not shown). The pulse $P_1$ increases from a quiescent value representing a 0 to a positive value representing a 1 and then drops back to the value representing 0. The pulse $P_2$, on the other hand, decreases from a quiescent level representing a 1 to a level representing a 0 and then rises again to the level representing 1. Thus, it is apparent that in the absence of the pulses $P_1$ and $P_2$ the control terminals *a* and *b* of the registers 50 and 60 have applied thereto signals of opposite binary value. This is the memory or A type (see FIGURE 2) of operation and the binary signals stored in the registers 50 and 60 remain as they are regardless of other changes.

To shift information from the register 50 into the register 60, the control pulses $P_1$ and $P_2$ are generated one after another, in either order. Assume that pulse $P_1$ occurs first. When the leading edge of pulse $P_1$ is generated, the control terminals $a$ and $b$ in all the stages of register 60 receive a 1. This is the B type of operation (see FIGURE 2) and if a 1 is present in a stage of register 50 it is transferred into the corresponding stage of the register 60.

At the termination of the pulse $P_1$, the shift line 70 drops back to the binary 0 level. The leading edge of the pulse $P_2$ then drops the shift line 72 to the binary 0 level so that $a$ and $b$ of all stages are 0. This is the C type of operation (see FIGURE 2). Any 0 present in a stage of register 50 is transferred into the corresponding stage register 60.

At the expiration of the pulse $P_2$, the control signal $b$ returns to the binary 1 level. The control signals $a$ and $b$ are then of opposite binary values and the register 60 is operating in the manner shown at A in FIGURE 2.

The delay circuits 74 and 76 are provided to delay the pulses $P_1$ and $P_2$ so that binary signals are shifted into the register 50 subsequent to the shifting of binary signals into the register 60. As the pulses progress in one direction from right to left, binary information is effectively shifted in the opposite direction, from left to right.

The input signal $x$ to the register 50 may be derived from another four bit register of the same form, from the common bus in a computer, or even from the other register 60. In the latter case the output of gate 60*a* could be fed to the input of gate 50*b*, gate 60*b* to gate 50*c*, and so on, so that registers 50 and 60 together act as a bit-serial shift register. The shifting of information into the register 60 from either the register 50 or a bus line is essentially a two-step operation. In the first step, 1 signals are transferred and in the second step, 0 signals are transferred. The transfer may be effected in the reverse order by generating the $P_2$ pulse before the $P_1$ pulse. No inter-stage coupling or gating is needed to transfer signals into the register 60.

Figure 14:
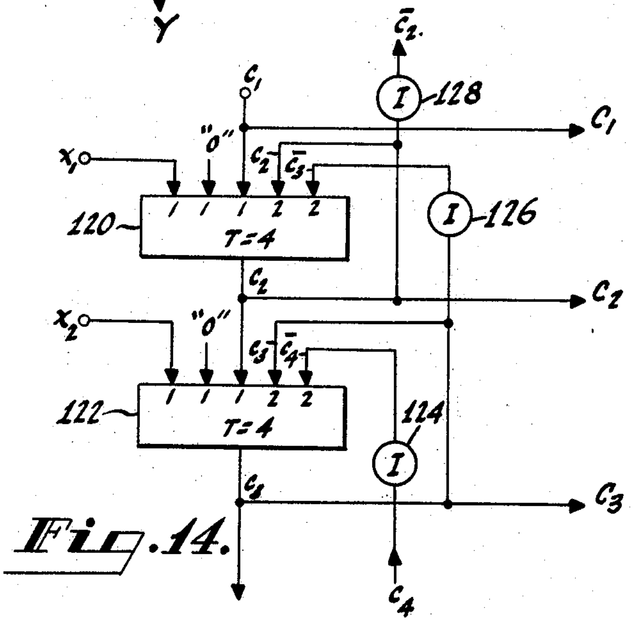
FIGURE 14 is a block diagram of a cascaded asynchronous logic network according to the invention.

A portion of a second system employing the building blocks of the invention is shown in FIGURE 14. The system includes cascaded gates 120 and 122, inverters 124, 126 and 128, various interconnections among the gates and feedback connections. (The inverters, while shown separately need not be separate circuits. The logical inversion may instead be performed within the gate. For example, $\bar{c}_3$ may be obtained from the output terminal of a threshold gate such as described in Clapper Patent No. 3,038,091, dated June 5, 1962, and $c_3$ from the other output terminal of the same gate.) The gates of FIGURE 14 are analogous to the gates of FIGURE 5, however, one of the feedback connections in FIGURE 14 corresponds to a control signal connection in FIGURE 5 but with weight 2 and one of the inputs in FIGURE 14 corresponding to a third control signal input in FIGURE 5 is permanently connected to a permanent bias level of 0. As an alternative, threshold gates with four inputs of weights 1, 1, 2, 2 and with a threshold $T=4$ may be employed, and the 0 bias input omitted. (This gate is the equivalent of the gate shown.)

The arrangement of FIGURE 14 may be employed in the control logic circuits of any asynchronous computer, for example, in the control logic circuits either for a multiplier, or in an arrangement for implementing an instruction-fetch command. Each threshold gate corresponds to one possible state of the control unit, and normally (except for short transition times) only one gate in the chain at a time has an output signal of 1. The transition from one state to the next may take place at some predetermined time (in a synchronous situation) or upon completion of some particular task (in an asynchronous situation).

In one type of circuit operation, the control signal $c_1$ is sent to a processing portion of the computer and initiates theer some process. The signal $x_1$ is the "return" signal from the processor or from a time-pulse generator and it indicates that the process has been completed. This signal causes gate 120 to become "set" (four of the input weights have the value of 1), so that control signal $c_2$ is sent to the processor, and at the same time signal $c_2$ is inhibited. The latter occurs because $\bar{c}_2$, the signal sent to the preceding stage (not shown), has changed to 0 and $x_0$ (not shown) is also 0. The circuit state then remains stable until the return signal $x_2$ initiates the transition of the circuit to its next state, that is, gate 122 becomes set, gate 120 becomes reset, signal $c_3$ is sent to the processor, and signal $c_2$ is inhibited. Other stages (not shown) after 122 operate in the same way.

In more detail, note that in the circuit illustrated when $c_1=c_2=c_3=0$, the situation is stable—the control is in some state not represented in the figure. This is because the total number of input weights corresponding to 1 is at most three (a possible $x$, and the inverted signal $\bar{c}_i$ from a later stage) and the threshold of 4 is not attained, so the outputs $c$ remain 0.

Suppose now that $c_1$ becomes a 1 indicating that the machine is in a state represented by a gate not shown, but that gate 120 may be the next state desired. No change takes place, however, as long as the return signal $x_1$ is 0, and the control system waits. When $x_1=1$, then a total of four input weights are 1—$x_1$, $c_1$, and $\bar{c}_3$—so the output $c_2$ becomes 1, and this signal causes the next process to be performed by the machine to start. Also, $c_2$ is fed back through an inverter to set $c_1=0$ in a manner to be illustrated below for $c_2$. However, even when $c_1$ becomes 0, $c_2$ remains 1 because of the feedback of $c_2=1$.

The control system now waits again until $x_2$ becomes 1. When it does, gate 122 has a total input weight of four 1's and so $c_3$ becomes 1. The signal $c_3=1$ causes the next process to start. At the same time, $\bar{c}_3$ becomes 0, so the total input weight at gate 120 is at most three 1's ($x_1$ possibly, and $c_2$), so $c_2$ becomes 0.

The operation described above continues for any number of cascaded stages. A stage will be "turned on" if the preceding stage is on and if the immediately following stage is "off." Each time a stage goes on, it automatically turns off the preceding stage.

In the example above, a transition of the circuit to the next state is accomplished by a simple return or time pulse signal but, in general, other circuits may be used, where more complicated logic is performed. For example, it may be required that the transition to the next state take place when two return signals are simultaneously present. In this case, circuits similar to the one of FIGURE 10 may be used (except with more control lines), for the cascaded stages of FIGURE 14.

The circuit of FIGURE 14 may be employed in a configuration which includes multiple parallel branches by using a return signal $x_i$ for acuating one branch and a complementary return signal $x_i$ for another branch.

In the embodiment of the invention illustrated, the complementary feedback signal $\bar{c}_i$ generated by stage $i$, is applied to the immediately preceding stage $(i-1)$. However, in general, it is applied to the $(i-j'\text{th})$ stage where $j$ may be 1 or some other integer.

It is also to be appreciated that while in the embodiment of FIGURE 14 there is only a signal information signal (the return signal $x$) in general there may be up to $p$ such signals, where $p$ is an integer such as 1, 2, 3 and so on. In the case in which $p$ is 1 the logic function performed by the circuit is the identity function, that is, $c_{(i+1)}=x_i$. In the case in which $p$ is greater than 1, the circuit may perform some logic function other than this. For example, if $p=3$ and the returns to the $i$'th stage are $x_1$, $x_2$, $x_3$, the output of the $i$'th stage when $(c_i=1)$ may be equal to MAJ$(x_1, x_2, x_3)$, or $x_1x_2x_3$, or $x_1+x_2+x_3$ and so on. The logic functions it is desired to perform determine the particular one(s) of the gates which have been discussed to be employed as the stages of the network.

As a general proposition, in a network such as shown in FIGURE 14, each gate has a threshold T. The sum of the weights of the complementary input signal, the signal from the preceding stage and at least one of the $p$ information signals to each gate is at least equal to T; the sum of the weights of the complementary input signal and the feedback signal to each gate is at least equal to T; the sum of the weights of the feedback signal and the $p$ information signals to each gate is less than T, and the sum of the weights of the complementary input signal and the signal from the preceding stage applied to each gate is less than T.

There are a number of important advantages of using threshold gates to generate control signals in the manner discussed above. The design is very simple—each gate corresponds to a state in the designer's state diagram. Malfunctions are very easily discovered since gates are used for only one purpose, not shared between many different states. And, the number of gates required is small, since logical functions—determination of when state transitions should take place—are combined with the memory function—remembering which state the machine is in—both in a single gate.

Figure 15:
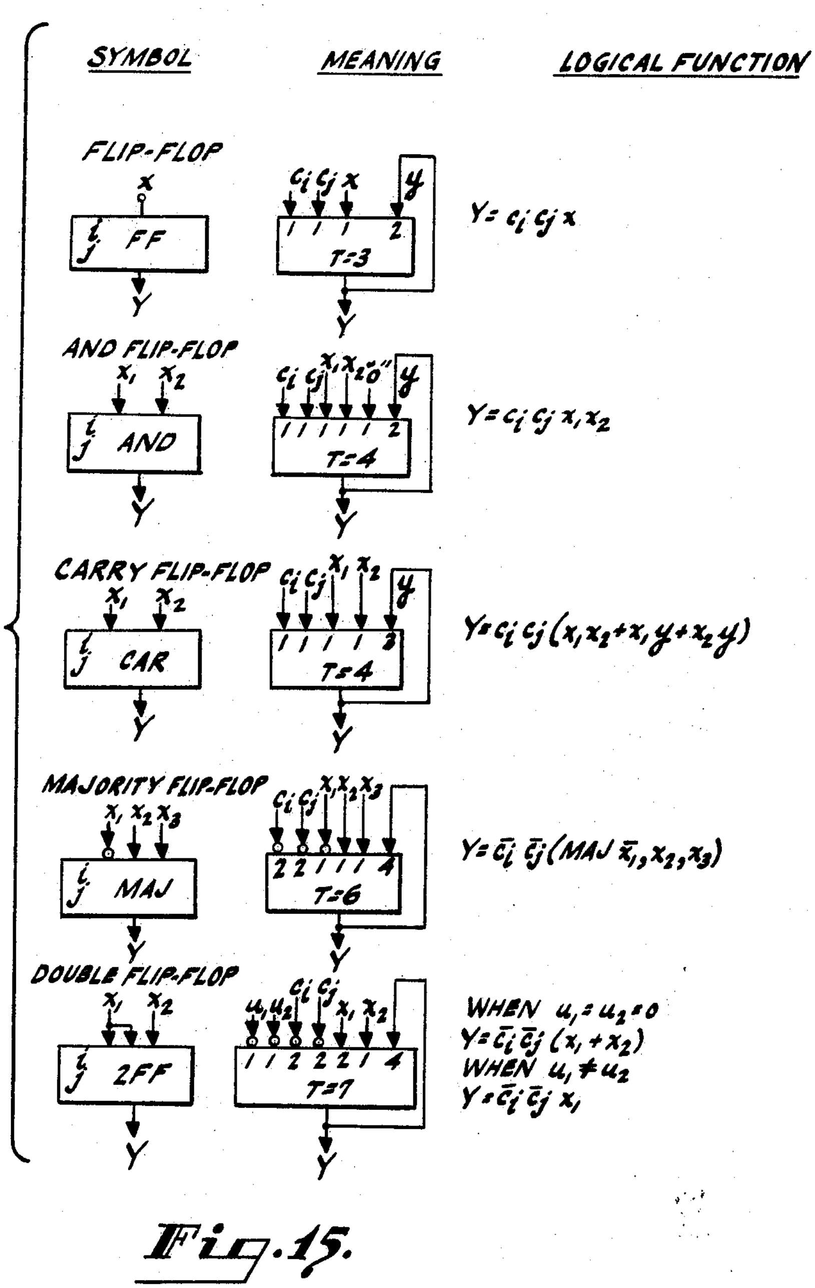
FIGURE 15 is a drawing of the conventions employed n FIGURE 16.
Figure 16:
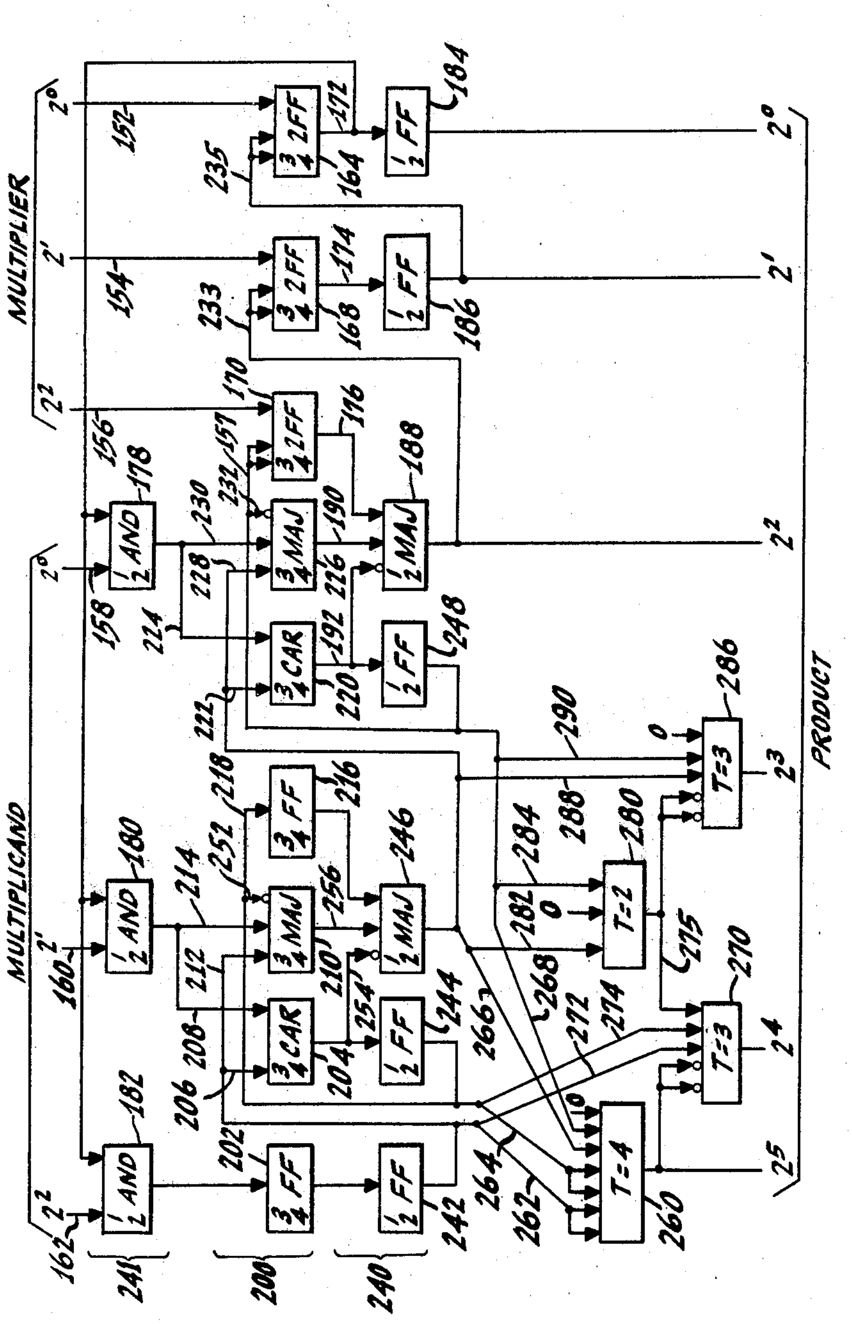
FIGURE 16 is a block diagram of a multiplier according to the invention.

A multiplier which employs the building blocks of the invention is shown in FIGURE 16. To simplify the drawing, the control signal terminals and the feedback terminals of the various building blocks are not shown. The meaning of the symbols employed in FIGURE 16 is given in FIGURE 15. Note that the flip-flop is the circuit of FIGURE 1; the AND flip-flop is the circuit of FIGURE 5 since one of the $x$'s, in practice, is a constant throughout a complete multiplication cycle and therefore is considered as a control signal; the carry flip-flop is the circuit of FIGURE 10; the majority flip-flop is essentially the circuit of FIGURE 11; and the double flip-flop is the circuit of FIGURE 12.

The inputs $c_i$ and $c_j$ refer to the clock or timing pulses. In practice, there are four such pulses $c_1$, $c_2$, $c_3$ and $c_4$. Initially, $c_1=0$, $c_2=1$, $c_3=0$ and $c_4=1$. A notation of two numbers ,one beneath the other, within a block, as, for example, the number 2 beneath the number 1, means that during the first time period $c_1$ changes from 0 to 1 and then back to 0, and during the second time period, which occurs after the first time period, $c_2$ changes from 1 to 0 and then back to 1. The convention is also adopted for the double flip-flop block that $U_1$ is always a 0. $U_2$ changes from 1 to 0 then back to 1 as will be discussed in the operation of the multiplier.

In a number of cases, an input passes through a small circle before arriving at a block. The circle indicates logical inversion. For example, in the case of the majority flip-flop block (MAJ) of FIGURE 15 when $x_1$ is 0, a 1 is applied to the majority flip-flop block. The logical inversion may be accomplished by a separate inverter, however, in practice, the inversion occurs within a block. One way in which this may be done is to employ the complementary output of the stage generating the signal in the manner already discussed.

While not shown, it is to be understood that all of the blocks in the multiplier of FIGURE 16 are initially in a state such that they produce 0 outputs. This state may be achieved in one of a number of ways. As one example, the multiplier may be made to multiply 000×000. As another example, one actually employed in a practical circuit. there may be an overriding reset connection to each building block (not shown) which applies an input to that building block sufficient to force the output to 0. In a transistorized threshold gate building block, this may be accomplished, for example, by applying through a diode a signal of appropriate polarity and level directly to the base electrode of a transistor in the block.

The multiplication algorithm carried out by the multiplier of FIGURE 16 is given below. The specific example chosen is the multiplication of 5 (101) by 7 (111) to obtain a product of 35 (100011).

| | | | | | | | |
|---|---|---|---|---|---|---|---|
| | | | 1 | 0 | 1 | | Multiplicand. |
| | | | 1 | 1 | 1 | | Multiplier. |
| | | | 0 | 0 | 0 | | Initial sum. |
| | | 0 | 0 | 0 | | | Initial carry. |
| | | | 1 | 0 | 1 | (a) | First partial product. |
| | | | 1 | 0 | 1 | (b) | Sum. |
| | | 0 | 0 | 0 | | (c) | Carry. |
| | | 1 | 0 | 1 | | (d) | Second partial product (shifted one place to left). |
| | | 1 | 1 | 1 | 1 | (e) | Sum of b, c, and d. |
| | 0 | 0 | 0 | | | (f) | Carry of b, c and d. |
| | 1 | 0 | 1 | | | (g) | Third partial product (shifted another place to left). |
| | 1 | 1 | 0 | 1 | 1 | (h) | Sum of e, f and g. |
| 0 | 0 | 1 | | | | (i) | Carry of e, f and g. |
| 1 | 0 | 0 | 0 | 1 | 1 | | Final product (normal addition of h and i). |

Note that in each step of the multiplication, the sum, carry, and partial product are added and any carries which result from this addition are separately stored. Only in the final step is an addition carried out in the "normal" way, that is, where the carry "ripples" from bit to bit. Because of the absence of carry ripple except for the final step, and because the storage of partial products, sums and carries occurs in the multiplier itself, the multiplication time is extremely fast. In a practical multipler the multiplication time may be 40 nanoseconds or less per multiplier bit. For three bits, the total time is 120 nanoseconds plus the relatively short ripple time through the gates 260, 280, 270, 286.

In the operation of the multiplier of FIGURE 16, the three multiplier bits are applied to leads 152, 154 and 156, respectively, and the three multiplicand bits are applied to leads 158, 160 and 162, respectively. The significance of the bits is indicated by the numbers $2^0$, $2^1$, $2^2$, respectively. The first half cycle of multiplication cycle starts at time periods 3 and 4. During time period 3, $c_3$ is changed from 0 to 1 to 0 and during the time period 4, $c_4$ is changed from 1 to 0 to 1. During the first occuring time period of $c_3$ and $c_4$ (that is, the length of time from the start of $c_3$ to the end of $c_4$, the first half cycle) $U_2$ is changed from 1 to 0 and upon the termination of the half cycle $U_2$ changes back to 1. During the remainder of the multiplication, $U_2=1$ and $U_1=0$. (It may be observed from FIGURE 15 that $U_1$ and $U_2$ are control inputs to the double flip-flops.)

Assume that the multiplier is 111 and the multiplicand is 101, as in the example above. During the time period occupied by $c_4$ of the first half cycle, $c_3$ is 0, $c_4$ is 0, $U_1$ is 0 and $U_2$ is 0 so that six of the thirteen input weights to double flip-flops 164, 168 and 170 are 1. Since the multiplier is 1, 1, 1, the $x_2$ inputs to each double flip-flop is 164, 168 and 170 is 1, and each such flip-flop's threshold of 7 is attained. These flip-flops thereupon produce ones at output leads 172, 174 and 176 and the flip-flop 164 feeds back its 1 output to AND gates 178, 180 and 182.

During the second half cycle, $c_1$ changes from 0 to 1 to 0 and then $c_2$ changes from 1 to 0 to 1. During the interval of $c_1$, AND gates 182 and 178 become set since, in each case, $c_1=c_2=x_1=x_2=1$ (see FIGURE 15) so that four of the seven input weights are 1. During the second time period, $c_1$ and $c_2$ both equal 0, however, the feedback connection of AND gates 182 and 178 and the multiplicand signal inputs (which remain constant throughout the multiplication, and can be considered as as control signals) to these AND gates maintain these gates in the 1 state. After the second time period $c_1 \neq c_2$ and AND gates 178, 180 and 182 continue to store the information transferred to these gates, namely 1, 0 and 1, respectively.

During the same period as discussed above, namely, the period during which AND gates 178, 180 and 182 are operated, the same clock pulses $c_1$ and $c_2$ are applied to flip-flops 184 and 186 and majority gate 188. Flip-flops 184 and 186 receive 1's on leads 172 and 174, respectively and store these 1's. Majority gate 188 receives a 1 on lead 176 and a 0 on lead 190 and a 0 on lead 192. However, this last 0 is inverted at gate 188 so that two of three inputs are 1 and majority gate 188 therefore stores a 1.

During the next two time intervals, the gates in the second cascade 200 are operated. Flip-flop 202 reecives and stores a 1. Carry flip-flop 204 receives a 0 on lead 206 and a 0 on lead 208 and therefore stores a 0. Majority gate 210 receives a 0 on lead 212 and a 0 on lead 214 and therefore stores a 0. Flip-flop 216 receives a 0 on lead 218 and therefore stores a 0. Carry flip-flop 220 receives a 0 on lead 222 and a 1 on lead 224 and since its output at 192 is a 0, it continues to store a 0. Majority gate 226 receives a 0 at lead 228 and a 1 at lead 230 and a 0 at lead 232, however, the 0 lead 232 is inverted at the gate so that majority gate 226 becomes set and stores a 1. Double flip-flop 170 receives a 1 at lead 156 and a 0 at lead 157. Since $U_2=1$, this double flip-flop stores a 0 (see FIGURE 15.) Double flip-flop 168 receives a 1 at lead 154 and a 1 at lead 233 and therefore stores a 1. Double flip-flop 164 receives a 1 at lead 152 and a 1 at lead 235 and therefore stores a 1.

The operation discussed above and the succeeding cycles of the circuit operation is given in the table below. The 1's and 0's within the table indicate the outputs of the gates.

| Gate number | | | | | | | | | Half cycle |
|---|---|---|---|---|---|---|---|---|---|
| 202 | 204 | 210 | 216 | 220 | 226 | 170 | 168 | 164 | |
| 0 | 0 | 0 | 0 | 0 | 0 | 1 | 1 | 1 | First $U_2=0$, $U_1=0$ |
| 1 | 0 | 0 | 0 | 0 | 1 | 0 | 1 | 1 | Third $U_2=1$, $U_1=0$ |
| 1 | 0 | 1 | 0 | 0 | 1 | 0 | 1 | 1 | Fifth $U_2=1$, $U_1=0$ |
| 1 | 0 | 1 | 0 | 1 | 1 | 0 | 1 | 1 | Seventh $U_2=1$, $U_1=0$ |

| Gate number | | | | | | | | | | Half cycle |
|---|---|---|---|---|---|---|---|---|---|---|
| 182 | 180 | 178 | 242 | 244 | 246 | 248 | 188 | 186 | 184 | |
| 1 | 0 | 1 | 0 | 0 | 0 | 0 | 1 | 1 | 1 | Second |
| 1 | 0 | 1 | 1 | 0 | 0 | 0 | 1 | 1 | 1 | Fourth |
| 1 | 0 | 1 | 1 | 0 | 1 | 0 | 1 | 1 | 1 | Sixth |
| 1 | 0 | 1 | 1 | 0 | 1 | 1 | 0 | 1 | 1 | Eighth |

The four threshold gates 260, 280, 270 and 286 shown at the lower left of FIGURE 16 perform the final addition involving carry ripple with one stage of "carry lookahead." Gate 260 receives a 1 at lead 262, a 0 at lead 264, a 1 at lead 266 and a 1 at lead 268. Accordingly, the threshold 4 of the gate is equaled and it produces a 1 output. This is the $2^5$ bit.

Threshold gate 280 receives a 1 lead at lead 281 and a 1 at lead 284 and accordingly, produces a 1 output. Threshold gate 270 receives a 0 at lead 274 and a 1 at lead 275. This gate also receives the inverted output of gate 260. Accordingly, only two of the five inputs are 1 and the gate produces a 0 output. The $2^4$ bit therefore is 0.

Threshold gate 286 receives a continuous value of 0 and receives a 1 from gate 280. This 1 is inverted so that three of the five inputs to gate 286 are 0. Accordingly, gate 286 produces a 0 output, that is, the $2^3$ bit equals 0. It may be observed, from the table, that the $2^2$, $2^1$ and $2^0$ bits are 0, 1, 1, respectively. Accordingly, the final product is 100011=35 which is the correct answer.

One final point which is implicit in the discussion of the operation of the multiplier is the use of groups of stages such as 220, 226, 170, 248 and 188 and 204, 210, 216, 244 and 246, as adders with built in storage. The four input bits in the first case are the $2^2$ multiplier bit, the bit produced by AND gate 178 (a partial product bit) the carry bit produced by stage 248 and the bit produced by MAJORITY gate 246 (a sum bit). A carry bit, in the first case, is produced by stage 248 and a sum bit by stage 188. The three input bits, in the second case, are the carry bit produced by stage 244, the partial product bit produced by stage 180 and the sum bit produced by stage 242.

What is claimed is:

1. A circuit for performing both storage and logic functions comprising, in combination:

a threshold gate having an input circuit and an output circuit;

means for applying $n$ input signals $x_1 \ldots x_n$, with respective weights $w_1 \ldots w_n$ to said input circuit to said gate, where $n$ is an integer equal to at least 1 and $w_1 \ldots w_n$ are integers;

feedback means for feeding back the signal present at the output circuit of the threshold gate to the input circuit to the gate with weight $w$, where $w$ is an integer at least equal to 2 and greater than the sum of $w_1 \ldots + w_n$; and means for effectively applying $m$ control signals $c_1 \ldots c_m$ to the input circuit to said gate with respective weights $v_1 \ldots v_m$, where $m$ is an integer greater than 1 and $v_1 \ldots v_m$ are integers equal to at least 1.

2. The circuit of claim 1, wherein $n=1$, $w_1=1$, $w=2$, $m=2$ and $v_1=v_2=1$, and wherein said gate has a threshold of 3.

3. The circuit of claim 1, wherein $n=1$, $w_1=1$, $w=2$, $m=4$ and $v_1=v_2=v_3=v_4=1$, and wherein said gate has a threshold of 4.

4. The circuit set forth in claim 1, wherein $n=2$, $w_1=w_2=1$, $w=3$, $m=2$, $v_1=v_2=1$, and wherein said gate has a threshold of 4.

5. The circuit set forth in claim 1, wherein $n=3$, $w_1=w_2=w_3=1$, $w=4$, $m=3$, $v_1=2$. $v_2=v_3=1$, and wherein said gate has a threshold of 6.

6. The circuit set forth in claim 1, wherein $n=2$, $w_1=2$, $w_2=1$, $w=4$, $m=4$, $v_1=v_2=2$, $v_3=v_4=1$, and wherein said gate has a threshold of 7.

7. The circuit set forth in claim 1, wherein $n=3$, $w_1=w_2=w_3=1$, $w=4$, $m=2$, $v_1=v_2=1$, and wherein said gate has a threshold of 4.

8. In combination:

a threshold gate having an input circuit, an output circuit and a threshold of at least 3;

means for applying $n$ information signals $x_1 \ldots x_n$ to said gate with respective weights $w_1 \ldots w_n$ where $n$ is equal to at least 1 and $w_1 \ldots w_n$ are integers equal to at least 1;

means coupled between the output and input circuits of said gate for feeding back to the input circuits of said gate a signal $y$ with weight $w$, where $w$ is an integer equal to at least 2; and means for controlling the gate to operate as one of a storage circuit which is insensitive to the values of the $n$ information signals and a circuit which realizes at least one logic function of $y$ and at least one of $x_1 \ldots x_n$.

9. The circuit of claim 8, wherein said nast-named means comprises means for controlling the gate to operate as one of a storage circuit which is insensitive to the values of the $n$ information signals and a circuit which realizes an AND function of $y$ at least one of $x_1 \ldots x_n$.

10. The circuit of claim 8, wherein said last-named means comprises means for controlling the gate to operate as one of a storage circuit which is insensitive to the value of the $n$ information signals and a circuit which realizes a majority function of $y$ and at least two of $x_1 \ldots x_n$.

11. The circuit of claim 9, wherein said last-named means comprises means for controlling the gate to operate as one of a storage circuit which is insensitive to the values of the $n$ information signals, a circuit which realizes an AND function of $y$ and at least one of $x_1 \ldots x_n$, and a circuit which realizes an OR function of $y$ and at least one of $x_1 \ldots x_n$.

12. The combination set forth in claim 8, wherein $n=2$, $w_1=w_2=1$, and wherein the last-named means includes means for controlling the gate to realize the logic functions $y(x_1+x_2)$, $y+x_1 \cdot x_2$ and MAJ$(y, x_1, x_2)$.

13. The combination set forth in claim 8, wherein $n=3$, $w_1=w_2=w_3=1$, and wherein the last-named means comprises means for controlling the gate to realize the logic functions $y \cdot MAJ(x_1, x_2, x_3)$ and $y+MAJ(x_1, x_2, x_3)$.

14. The combination set forth in claim 13, wherein the last-named means comprises means for controlling the gate to realize the logic function $\text{MAJ}(x_1, x_2, x_3)$.

15. The combination of claim 8, wherein $n=2$, $w_1=2$, $w_2=1$, and wherein the nast-named means comprises means for controlling the gate to realize the functions $y+x_1$ and $yx_1$.

16. The circuit of claim 8, wherein said last-named means comprises means for controlling the gate to realize an OR function of $y$ and at least one of $x_1 \ldots x_n$.

17. In combination:

a threshold gate having an input circuit and an output circuit;

means for applying $n$ input signals $x_1 \ldots x_n$, with respective weights $w_1 \ldots w_n$ to said input circuit to said gate, where $n$ and $w_1 \ldots w_n$ are integers;

feedback means for feeding back the output signal of the threshold gate to the input circuit to the gate with weight $w$, where $w$ is an integer greater than the sum of $w_1 \ldots +w_n$;

means for causing said gate to store information comprising means for applying $m$ control signals $c_1 \ldots c_m$ to the input circuit to said gate with respective weights $v_1 \ldots v_m$, where $m$ is an integer greater than 1, $v_1 \ldots v_m$ are integers, the weight of the control signals representing 0 is equal to the weight of the control signals representing 1, and the weight of the feedback signal plus one half the total weight of the control signals at least equal the threshold of the gate; and means for causing the gate to perform logic functions other than the memory function comprising means for changing the values of the control signals.

18. A control circuit comprising, in combination;

a plurality of cascade connected threshold gates, each having an input circuit and an output circuit;

means for applying a signal from the output circuit of each gate as the first input signal to the input circuit of the following gate;

means for applying a feedback signal from the output circuit of each gate to the input circuit of the same gate;

means for applying the complement of the feedback signal to each gate to the input circuit of a preceding gate;

means for applying P information signals to each gate, where P is an integer; and each gate having a threshold T, where the sum of the weights of the complementary input signal, the first input signal and at least one of the information signals to each gate is at least equal to T, the sum of the weights of the complementary input signal and the feedback signal to each gate is at least equal to T, the sum of the weights of the feedback signal and the P information signals to each gate is less than T, and the sum of the weights of the complementary input signal and the first input signal to each gate is less than T.

References Cited

FOREIGN PATENTS 234,175 6/1961 Australia.

OTHER REFERENCES

Chu, Digital Computer Design Fundamentals, McGraw-Hill, 1962, pp. 234–240.

ROY LAKE, Primary Examiner

JAMES B. MULLINS, Assistant Examiner

U.S. Cl. X.R.

307—211, 238, 290